Patented Oct. 4, 1932

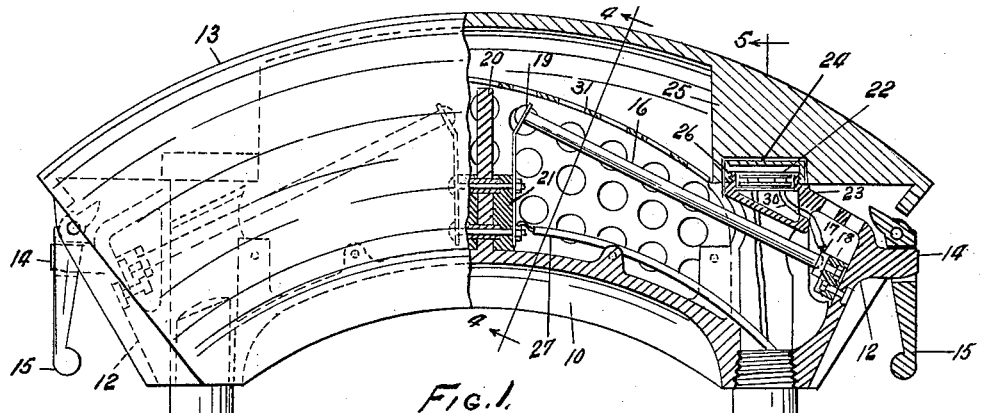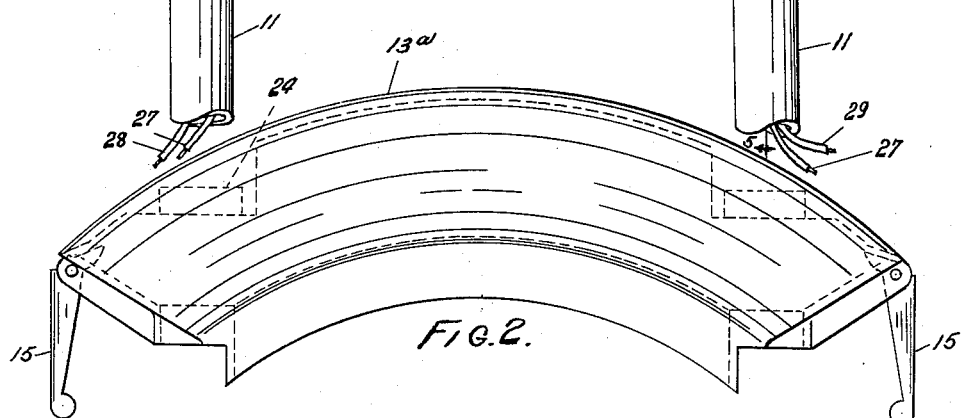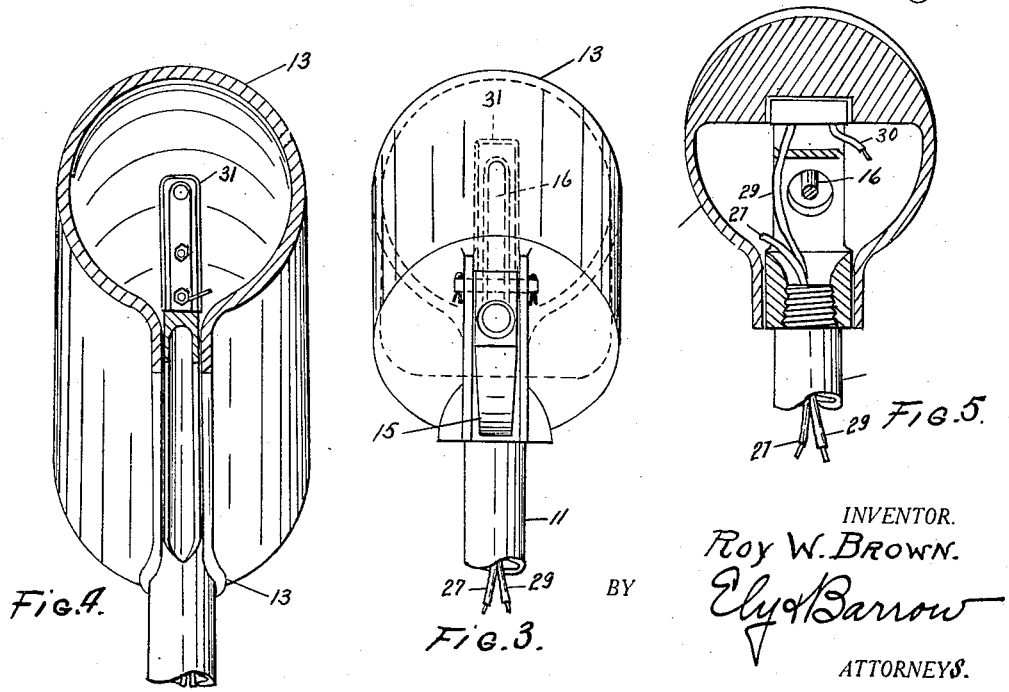

1,880,407

UNITED STATES PATENT OFFICE

ROY W. BROWN, OF AKRON, OHIO, ASSIGNOR TO THE FIRESTONE TIRE & RUBBER COMPANY, OF AKRON, OHIO, A CORPORATION OF OHIO

REPAIR VULCANIZER

Application filed January 30, 1929. Serial No. 336,076.

This invention relates to devices for vulcanizing tire repairs and particularly to electrically heated inside curing arms.

An object of the invention is to devise means for uniformly heating a repair core for curing arms at a constant temperature. Another object is to devise means for heating a repair core by radiation from an electrically operated heating element. A further object is to devise a curing arm and heating element wherein a number of repair cores of various sizes may be interchangeably used in combination with one heating element. Still another object is to devise a thermostatic control means housed within the core whose temperature is to be controlled and interposed between said core and a heating element. A still further object is to devise a repair vulcanizer provided with a plurality of heating elements each individually controlled by a thermostatic device interposed between each of said elements and an adjacent portion of said vulcanizer.

The foregoing and other objects are obtained by the device illustrated in the accompanying drawing and described below. It is to be understood that the device is not limited to the specific form thereof disclosed herein.

Of the accompanying drawing,

Figure 1 is a front elevation partly in section illustrating an electrically heated tire curing arm embodying the principles of the invention;

Figure 2 is a front elevation of a repair core of a different size which may be used in cooperation with the curing arm illustrated in Figure 1;

Figure 3 is an end elevation of the device as shown in Figure 1;

Figure 4 is a section taken on the line 4—4 of Figure 1; and

Figure 5 is a section taken on the line 5—5 of Figure 1.

Referring to the drawing, the numeral 10 denotes a support or frame carried on a pair of posts 11 which may be suitably mounted on a work bench or standard (not shown). The frame 10 is formed with side extensions 12 over which a hollow core 13 may be positioned. The core is provided with a suitable slot or opening in the bottom thereof to permit easy mounting and removal of the core over the frame. Portions 12 of the frame are provided with lugs 14 over which pivoted bales 15 may be swung to secure the core to the frame. Means for heating the core comprises an electrical heating element consisting of a resistor bar 16 of silicon carbide or other suitable material adapted to be heated to incandescence by the passage of an electrical current therethrough, the bar being supported on the frame by means of a socket 17 secured to extension 12 through an insulating block 18, and by a spring contact clip 19 attached to a supporting lug 20 formed on frame 10, a block of insulating material 21 being interposed between clip 19 and its support 20.

In order to maintain a uniform degree of heat in the curing arm a thermostatic device such as the well known "clicker" is interposed in the heating element circuit. This thermostat 22 is mounted within a supporting housing 23 and is protected by a screw cap 24 threaded to said housing and covering the thermostat. A projection 25 of the internal wall of the repair core 13 is formed to surround the thermostat and is provided with a socket 26 into which the latter may project. The thermostat is thus directly affected by the degree of heat in the wall of the curing core whereby uniformity of the degree of cure may be obtained. The core is constructed of metal possessing high heat conductivity, such as aluminum or copper. All portions of the arm will therefore tend to be maintained at the same heat. In order to guard against possible uneven heating of the two ends of the arm, however, there may be provided a pair of independently operated heating elements with separate controlling thermostats, as illustrated.

The invention further affords a simple construction adapting the device for use with tires of various sizes. Repair cores of various sizes are formed with identical internal portions for mounting the same upon the frame of the heating means, the different cores varying only in external dimensions or contours. Thus a repair core 13 for curing repairs on large size tires is shown in Figure 1, while Figure 2 shows a similar core 13ª having identical internal mounting portions but having an external size and contour adapted to fit within a smaller tire. The wiring of the device comprises preferably, connecting clips 19 to the common wire 27 of a three-wire circuit and connecting one of each of the other two wires 28 and 29 to each of the thermostats. The circuit is completed by wires 30 connecting each thermostat to the adjacent heating element socket 17.

In order to protect the heating element parts from damage while the operator is changing from one repair core to another a guard 31 of reticular screen or foraminous sheet metal may be attached to frame 10 to enclose said heating element parts.

The manner of operation of the device is sufficiently covered in the above description. Modifications of the invention may be resorted to without departing from the spirit thereof or the scope of the appended claims.

What is claimed is:

1. An electrically heated inside core or repair arm for vulcanizing tire repairs, comprising a heating unit frame, a pair of resistance bars mounted within said frame and a segmental core supported by said frame and enclosing said resistance bars whereby said core may be heated by radiation from said bars, electrical connections for transmitting power from an outside source to said resistance bars, a thermostatic heat controlling device interposed in the circuit of each of said resistance bars for independently controlling the power supplied to each bar, a pair of internal projections formed within the segmental core, each of said projections being formed with a recess and said heat controlling devices being housed within said recesses so as to be operated by the heat in the adjacent portion of said core.

2. An electrically heated inside core or repair arm for vulcanizing tire repairs, comprising a heating unit frame, a resistance bar mounted within said frame and a segmental core supported by said frame and enclosng said resistance bar whereby said core may be heated by radiation from said bar, electrical connections for transmitting power from an outside source to said resistance bar, a thermostatic heat controlling device interposed in the circuit of said resistance bar, an internal projection formed within the segmental core, said projection being formed with a recess and said heat controlling device being housed within said recess so as to be operated by the heat in the adjacent portion of said core.

3. An inside curing arm for vulcanizing tire repairs, comprising a hollow segmental core having a contour to conform to the interior of the tire to be repaired, a resistance bar mounted within said core and adapted to heat the same by radiation when the bar is heated to incandescence, and means for maintaining uniform vulcanizing heat in said core, said means including a thermostat interposed in the electrical circuit of the resistance bar and housed within a recess formed within the core.

4. An inside curing arm for vulcanizing tire repairs, comprising a hollow segmental core, a pair of contact clips within said core, a resistance bar mounted in said clips within said core and adapted to heat the latter by radiation, and means including a thermostat interposed in the electrical circuit of the resistance bar for maintaining a uniform vulcanizing heat in said core.

5. An inside curing arm for vulcanizing tire repairs, comprising a hollow segmental core having a contour to conform to the interior of the tire to be repaired, a resistance heating element mounted within said core and adapted to heat the same by radiation, and means for maintaining uniform vulcanizing heat in said core, said means including a thermostat interposed in the electrical circuit of the resistance heating element and housed within a recess formed within the core.

6. Tire repair apparatus comprising an open supporting frame, a heater unit mounted upon said frame, and a series of hollow segmental cores adapted to conform to the internal contours of various sizes of tires, said cores having local internal supporting seats of the same size, whereby the cores may be interchangeably mounted over said heater unit and upon said support.

In witness whereof, I have hereunto affixed my signature this 3rd day of January, 1929.

ROY W. BROWN.